US006873779B1

(12) United States Patent
Sonderegger et al.

(10) Patent No.: US 6,873,779 B1
(45) Date of Patent: Mar. 29, 2005

(54) APPARATUS FOR MULTI-DIMENSIONAL FIBER MANAGEMENT

(75) Inventors: Mark Sonderegger, Kanata (CA); Balwantrai Mistry, Nepean (CA)

(73) Assignee: Nortel Networks Limited, Ottawa (CA)

( * ) Notice: Subject to any disclaimer, the term of this patent is extended or adjusted under 35 U.S.C. 154(b) by 0 days.

(21) Appl. No.: 10/681,867

(22) Filed: Oct. 8, 2003

(51) Int. Cl.$^7$ ................................................. G02B 6/00
(52) U.S. Cl. ..................................................... 385/136
(58) Field of Search ......................................... 385/136

(56) References Cited

U.S. PATENT DOCUMENTS 6,019,142 A * 2/2000 Kurmis ..................... 140/93 A
6,732,983 B1 * 5/2004 Blake et al. ................ 248/74.2
2002/0150353 A1 * 10/2002 Chiu et al. ..................... 385/88

* cited by examiner

Primary Examiner—Javaid H. Nasri
(74) Attorney, Agent, or Firm—Guerin & Rodriguez, LLP; Michael A. Rodriguez

(57) ABSTRACT

Described is a fiber optic cable clip for managing fiber optic cables connected to a faceplate of an optical module by bulkhead adapters or small form-factor pluggable fiber optic transceiver modules. The fiber optic cable clip includes a clip body having a front side, an upper end, and a lower end. The clip body has a curved shape that bends vertically and laterally from the upper end to the lower end. The front side of the clip body has a groove extending therethrough. The groove is shaped for receiving and bending the fiber optic cable vertically and laterally from the upper end to the lower end in accordance with the curved shape of the clip body. Coupler means on the clip body couple the fiber optic cable within the groove of the clip body.

15 Claims, 7 Drawing Sheets

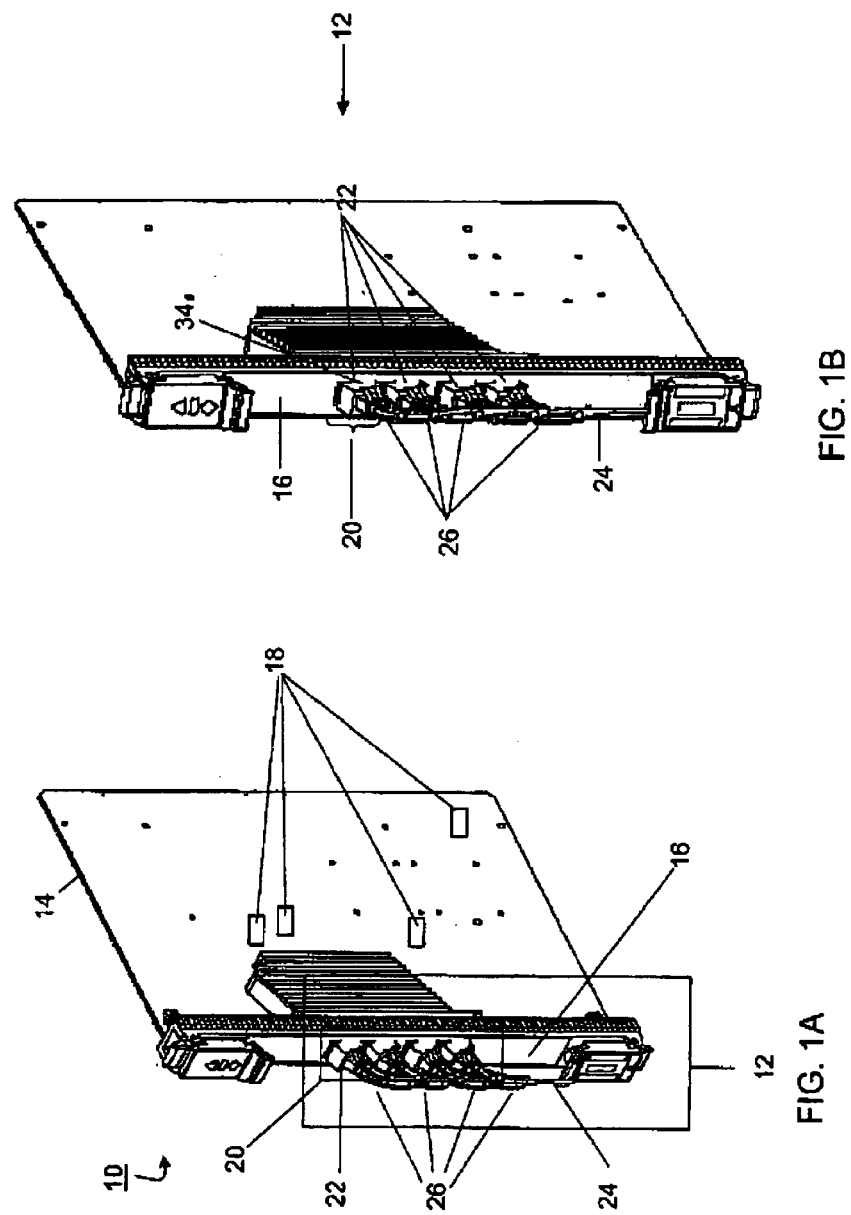

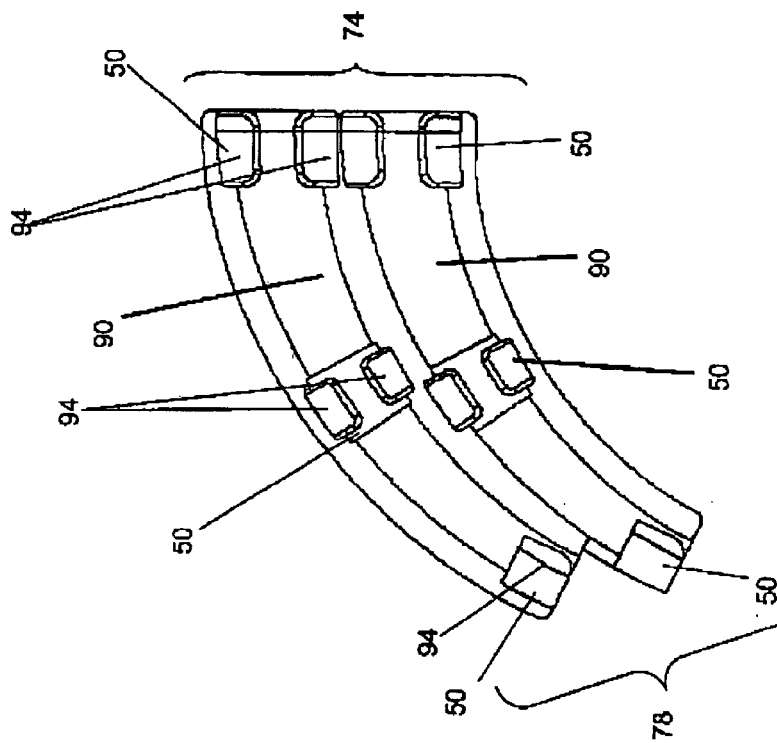
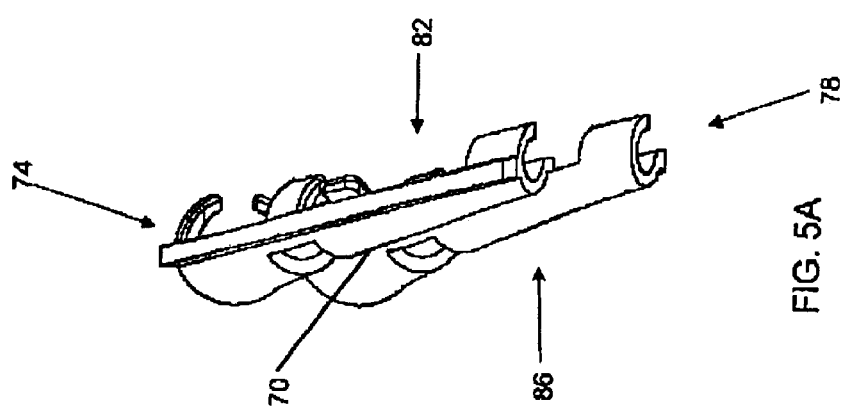
FIG. 5B
FIG. 5A

APPARATUS FOR MULTI-DIMENSIONAL FIBER MANAGEMENT

FIELD OF THE INVENTION

The invention relates generally to optical telecommunications systems. More particularly, the invention relates to a fiber clip for managing fiber optic cables.

BACKGROUND

Optical modules in an optical telecommunication system have a faceplate with one or more openings for receiving therein bulkhead adapters or small form-factor pluggable fiber optic transceiver modules (hereafter, generally SFPs). Each SFP connects one or more fiber optic cables to the optical module. Often, these SFPs are arranged vertically on the faceplate of the optical module. Traditional fiber management clips bend the fiber optic cables downward at approximately 90 degrees as the cables extend from the SFPs.

Typically, there are numerous cables connected to a particular optical module, all being bent and aligned in the same direction. Consequently, the cables tend to stack on each other over the SFPs. As a result, a significant amount of space is needed where the cables connect to the optical module to make room for this cable stacking. Additionally, to access an SFP that is located at a lower region of the faceplate, for example, to remove or repair the SFP, a technician often needs to remove cables that cover the SFP. Therefore, there is a need for a fiber management clip that manages cables so that the cables require less space and are less of an obstruction to a technician who needs access to the SFPs.

SUMMARY

In one aspect, the invention features cable clip comprising a clip body and coupler means. The clip body has a front side, an upper end, a lower end and a curved shape that bends vertically and laterally from the upper end to the lower end. The front side of the clip body has a groove extending therethrough. The groove is shaped for receiving and bending a cable vertically and laterally from the upper end to the lower end in accordance with the curved shape of the clip body. The coupler means couples the cable within the groove of the clip body.

In another aspect, the invention features a faceplate, a small form-factor pluggable fiber optic transceiver modules (SFP) connected to the faceplate, and a fiber optic cable assembly connected to the SFP. The fiber optic cable assembly includes a fiber optic cable. A clip body has a front side, an upper end, a lower end, and a curved shape that bends vertically and laterally from the upper end to the lower end. The front side of the clip body has a groove extending therethrough. The groove is shaped for receiving and bending the fiber optic cable vertically and laterally from the upper end to the lower end in accordance with the curved shape of the clip body. Coupler means on the clip body couple the fiber optic cable within the groove of the clip body.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 1A is a perspective view of an optical module embodying the principles of the invention, the optical module including a plurality of small form-factor pluggable fiber optic transceiver modules (SFP) having fiber optic cables connected thereto and fiber clips directing the fiber optical cables downward and to the side of the optical ports.

FIG. 1B is a perspective view of a portion of the optical module corresponding to the insert of FIG. 1A, the optical module portion including a plurality of SFPs, each having a pair of fiber optic cables connected thereto, and a plurality of fiber clips of the present invention.

FIG. 5A is a front view of one embodiment of the fiber clip.

FIG. 5B is a side view of the fiber clip.

DETAILED DESCRIPTION

Figure 3:
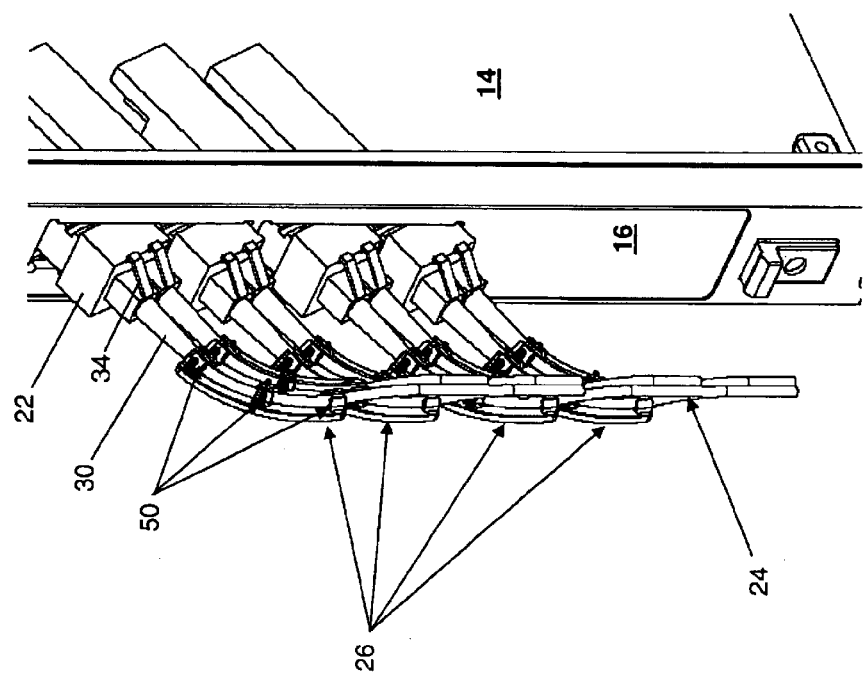
FIG. 3 is a side perspective of the fiber clips of the invention coupled to the fiber optic cables to bend the cables downward and to the side of the SFPs.

The present invention features a fiber clip for managing fiber optic cables (hereafter, fibers) that connect externally to an optical port of an optical module. The fiber clip bends the fibers in multiple dimensions. Guided by the fiber clips, the fibers bend downward (i.e., vertically) and to the side (i.e., horizontally or laterally) of small form-factor pluggable fiber optic transceiver modules (SFPs) to which the fibers are connected. This lateral bending facilitates access to the SFPs in the event of their repair or replacement.

FIG. 1A shows an embodiment of an optical module 10, such as can be used in an optical communications system or network, embodying the principles of the invention. Reference is also made to FIG. 1B, which shows an enlarged region of the optical module 10 corresponding to the insert 12 shown in FIG. 1A. The optical module 10 includes a printed circuit (PC) board (or interface card) 14 connected perpendicularly to a faceplate 16. The PC board 14 has a plurality of components 18 mounted thereon for performing various functions of the optical module 10, for example, converting between electrical and optical signals. The faceplate 16 can be constructed to provide an Electromagnetic Compatibility (EMC) boundary to shield electromagnetic interference (EMI) produced by the components 18.

The optical module 10 includes a plurality of vertically arranged optical ports 20. Each optical port 20 includes an SFP 22 that receives a pair of external fiber optic cables 24. As used herein, external means that the fiber optic cables 24 are outside of the optical module 10. Each fiber optic cable 24 includes at least one optical fiber. Hereafter, the fiber optic cables 24 are referred to as external fibers or fibers 24. The SFP 22 is connected to and passes through the faceplate 16 at an angle to provide ingress and egress for optical signals entering into and exiting from the optical module 10 over the fibers 24. One of the fibers 24 at each optical port 20 is for carrying transmitted optical signals and the other fiber 24 is for carrying received optical signals. Also, when the pair of fibers 24 is connected to the SFP 22, one of the fiber optic cables 24 is vertically arranged above the other fiber 24. Note that the embodiment shown has four optical ports 20. Other embodiments have more than four optical ports 20 and as few as one optical port 20, although the advantages of the invention are more apparent in embodiments with more than one optical port 20. Also note that the principles of the invention can extend to individual fibers, and not just to fiber pairs, as described in more detail below.

In one embodiment, each external fiber 24 terminates at an LC-type fiber optic cable assembly having a tapered, flexible or semi-rigid boot 30 and a "telephone jack" style latch-and-release mechanism (i.e., RJ-45 style) featuring a release tab 34 that connects the fiber optic cable assembly to the SFP 22. The diameter of the narrower end of the tapered boot 30 matches the diameter of the external fiber 24; the wider end is where the fiber optic cable assembly connects to the SFP 22. The angle at which the SFP 22 connects to the faceplate 16 causes the external fibers 24 to extend generally downward from the faceplate 16.

Without the use of the fiber management apparatus of the present invention, the external fibers 24 extending from each SFP 22 would continue to extend downward to cover the SFP or SFPs 22 directly below that SFP 22. One embodiment of the present invention features a fiber clip 26 that couples to a pair of external fibers 24, bends the fibers 24 further downward with controlled radii, and guides the fibers 24 to one side of the SFPs 22. Just as the vertical bending occurs gradually from one end of the fiber clip 26 to the other, the horizontally bending also occurs gradually.

Figure 2:
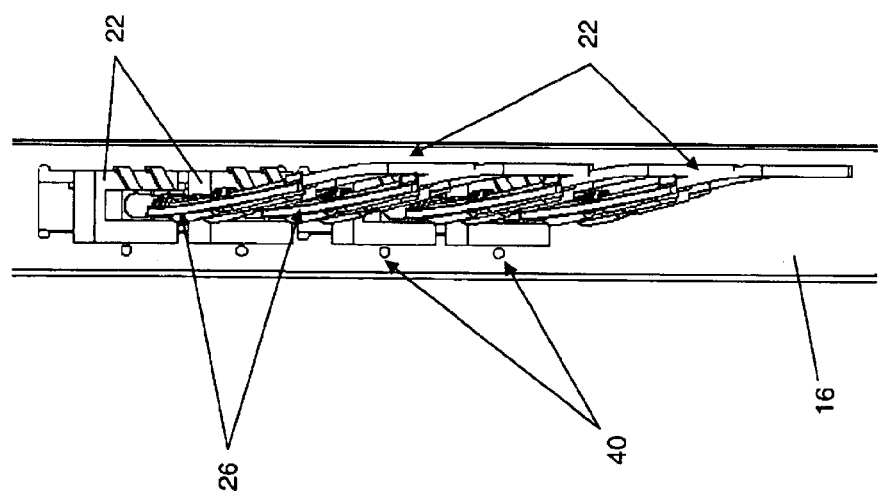
FIG. 2 is a front view of the optical module illustrating the guiding of the fiber optic cables to the right of the SFPs.

FIG. 2 shows the fiber clips 26 bending the fibers 24 towards the right side of the SFP 22 (from an external view of the faceplate 16, with the faceplate 16 lying in the plane of the drawing sheet). Guiding the fibers 24 away from the SFPs 20 reduces obstruction to the SFPs 22 below the SFP 22 to which the fibers 24 are connected. Also, by having the fibers 24 descend on the right side of the faceplate 16, the light-emitting diodes (LEDs) 40 on the left side of the faceplate 16 remain unobstructed, permitting a technician to see these status indicators without having to move the fibers 24. In another embodiment, the fiber clips 26 are constructed to bend and guide pairs of fibers 24 downward toward the left side of the faceplate 16. In still other embodiments, each fiber clip 26 bends and guides one fiber 24 only or more than two fibers 24. Although the principles of the invention are described with respect to bending external fibers, the fiber clip of the invention can also be used to bend internal fibers within the optical module 10 or within other housings.

FIG. 3 shows another perspective view of a portion of the optical module 10 with the fiber clips 26 coupled to the external fibers 24. As shown, each fiber clip 26 has a plurality of couplers 50 that are all on the same side of the fiber clip 26. The couplers 50 couple the fiber clip 26 to the pair of fibers 24: three couplers 50 for each fiber 24. Two of the three couplers 50 are at each end of the fiber clip 26, and the third coupler 50 is approximately in the middle of the fiber clip 26. One of the three couplers 50 couples to the boot 30 of the fiber optic cable assembly.

Figure 4:
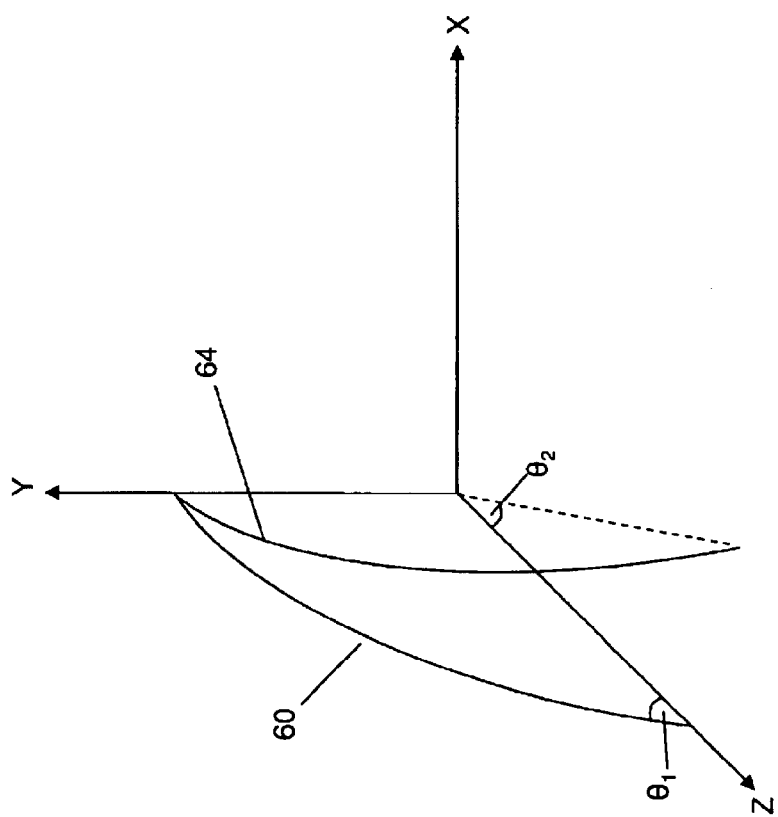
FIG. 4 is a graph illustrating the vertical and horizontal bending achieved by the fiber clip of the invention when the fiber clip is connected to the fiber optic cables.

FIG. 4 illustrates graphically the multi-dimensional bending achieved by the fiber clip 26 of the invention. A three-dimensional graph includes an X axis, a Y axis, and a Z axis. Consider that the XY plane defined by the X and Y axes is parallel to the plane of the faceplate 16 (FIG. 2). For purposes of providing a point of reference, a first curve 60 illustrates vertical bending without lateral bending. The first curve 60 starts on the Y axis, terminates on the Z axis, and lies wholly within an YZ plane defined by the Y and Z axes. This first curve 60 illustrates a curve produced by a fiber clip that bends in the vertical direction (here, along the Y axis) like the fiber clip 26 of the present invention, but not in a lateral direction (here, along the X axis). Fibers 24 extending from the faceplate 16 along the curve 60 would extend downward over the SFPs 22.

The second curve 64 illustrates a combination of vertical and lateral bending in accordance with the principles of the invention. The second curve 64 starts on the Y axis and terminates in the XZ plane defined by the X and Z axes. This second curve 64 illustrates an approximate curve of fiber managed by the fiber clip 26 of the invention. In one embodiment, the vertical bending is approximately 65 degrees (represented by angle $\theta_1$), and the lateral bending is approximately 15 degrees (denoted by angle $\theta_2$). The extent of vertical bending depends upon the minimum bend radii of the fibers to avoid breaking or kinking. The extent of lateral bending depends upon the degree of bending needed to reduce obstruction to the SFPs 22 by the external fibers 24. Fibers 24 extending from the faceplate 16 along the curve 60 extend downward and toward the right of the SFPs 22.

FIG. 5A and FIG. 5B show different views of an embodiment of the fiber clip 26 of the present invention. The fiber clip 26 is constructed of an integral piece of resilient material, such as Nylon 6/6, using a standard manufacturing technique, such as injection molding. FIG. 5A shows a front view of the fiber clip 26 including a clip body 70 having an upper end 74 and a lower end 78. In the front view, the fiber clip 26 is viewed as if coupled to fibers 24 extending from the faceplate 16, which lies in the plane of the drawing sheet. The clip body 70 has a front side (pointed to by arrow 82) and a back side (pointed to by arrow 86). The front view illustrates the extent of the rightwards lateral bending imposed by the fiber clip 26 on the external fiber 24.

FIG. 5B shows a side view of the fiber clip 26 viewed from the front side 82. The front side 82 of the clip body 70 has a pair of adjacent curved grooves 90 extending therethrough from the upper end 74 to the lower end 78. Each groove 90 closely receives one of the external fibers 24. The curved shape of the grooves 90 extending from the upper end 74 to the lower end 78 illustrates the controlled vertical bending that the fiber clip 26 imposes on each external fiber 24. The front side 82 of the clip body 70 has a plurality of couplers 50 extending therefrom. For each groove 90, one coupler 50 is at each of the upper and lower ends 74, 78 of the clip body 70 and one coupler 50 is located approximately centrally to the groove 90. Each groove 90 has an opening formed therein corresponding to the location of the centrally located coupler 50. The opening is a byproduct of fabricating the fiber clip 26. Each coupler 50 has a pair of arms 94.

One arm 94 extends toward the other from opposite sides of the corresponding groove 90. The ends of the arms 94 terminate with a gap therebetween through which the external fiber 24 is snapped into the groove 90 to couple the external fiber 24 to the clip body 70.

Figure 6:
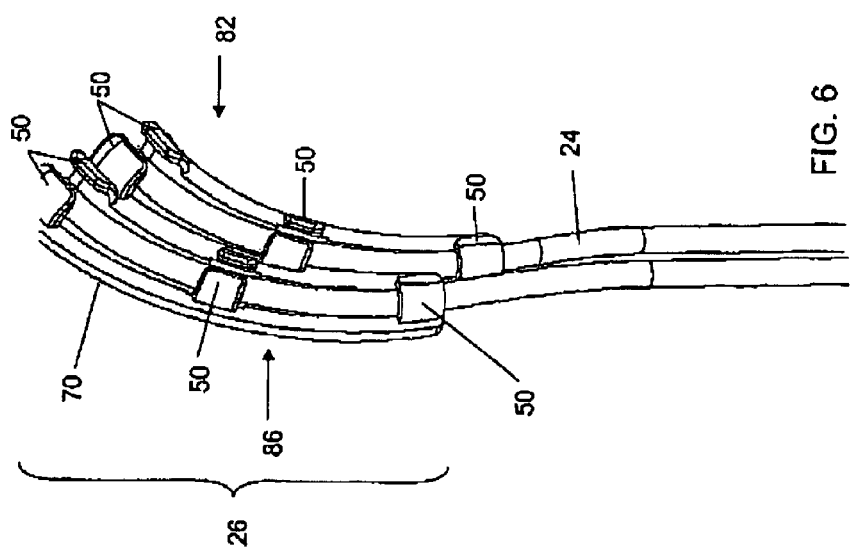
FIG. 6 is a view of the fiber clip of FIG. 5A and FIG. 5B coupled to a pair of fiber optic cables in accordance with the principles of the invention.

FIG. 6 shows a view of the fiber clip 26 coupled to a pair of external fibers 24. The front side 82 of the clip body 70, having the couplers 50 extending therefrom, faces and couples to the pair of external fibers 24. In general, the fiber clip 26 laterally bends the fibers 24 in the direction towards which the front side 82 is facing and towards which the couplers 50 extend. As shown, the fibers 24 are on the right of the fiber clip body 70, the front side 82 faces the fibers 24 on the right and the couplers 50 extend toward the right (with respect to the plane of the drawing sheet). Accordingly, the fiber clip 26 bends the fibers 24 laterally toward the right. To bend fibers laterally toward the left, another embodiment of the fiber clip has the fibers on the left side of the fiber clip body, with the front side 82 facing and the couplers 50 extending toward the fibers on the left. Referring also to FIG. 5A and to FIG. 5B, to place a pair of fibers 24 within the fiber clip 26, a technician aligns each fiber 24 over the gaps between the arms 94 of the couplers 50 and, by applying a small amount of pressure, snaps the fibers 24 into their respective grooves 90. To secure the fiber clip 26 to the fibers 24, the technician then slides the fiber clip 26 along the fibers 24 until the couplers 50 at the upper end 74 reach the boots 30 of the fiber optic cable assemblies. The boots 30 of the fiber optic cable assemblies are tapered, so moving the fiber clip 26 further up the boot 30 tightens the coupling between the fiber clip 26 and the fibers 24.

Figure 7:
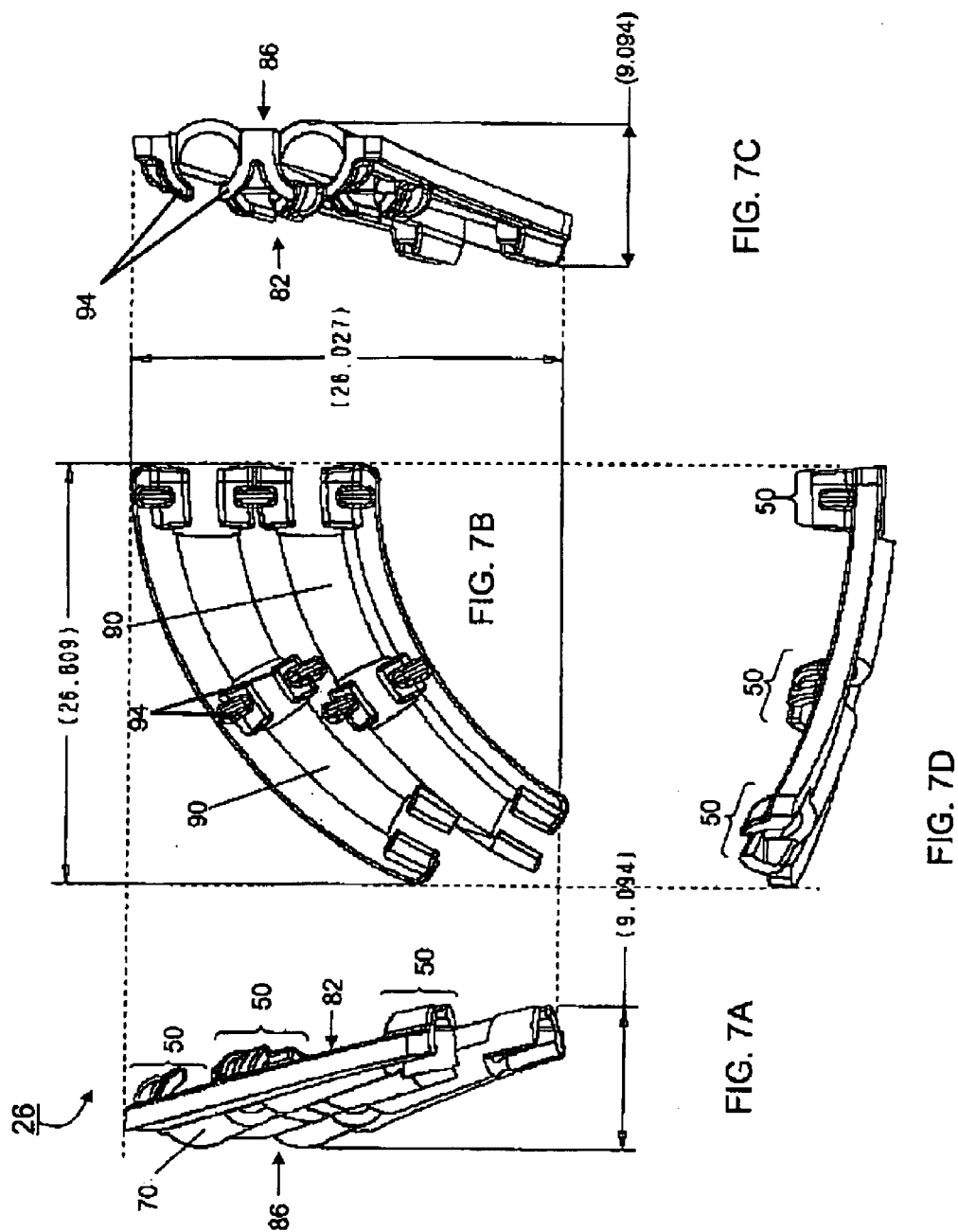
FIG. 7A is a front view of the fiber clip of FIG. 5A and FIG. 5B showing examples of dimensions for different features of the fiber clip.
FIG. 7B is a side view of the fiber clip of FIG. 5A and FIG. 5B showing examples of dimensions for different features of the fiber clip.
FIG. 7C is a rear view of the fiber clip of FIG. 5A and FIG. 5B showing examples of dimensions for different features of the fiber clip.
FIG. 7D is a bottom view of the fiber clip of FIG. 5A and FIG. 5B showing examples of dimensions for different features of the fiber clip.

FIG. 7A, FIG. 7B, FIG. 7C, and FIG. 7D show four related views of one embodiment of the fiber clip 26. Common to each of the views is an exemplary set of dimensions (given in millimeters). For each view, for purposes of perspective, consider that the fiber clip 26 is coupled to fibers 24 that are connected to the faceplate 16 (not shown), the faceplate 16 lying in the plane of the drawing sheet. FIG. 7A shows a front view of the fiber clip 26 (i.e., looking toward the faceplate), illustrating the extent of lateral bending towards the right imposed by the fiber clip 26 on the input fiber 24. FIG. 7B shows a side view of the fiber clip 26 that illustrates the controlled vertical bend radii that the fiber clip 26 imposes on the fibers 24. FIG. 7C shows a rear view of the fiber clip 26 (i.e., looking out from the faceplate 16). FIG. 7D shows a bottom view of the fiber clip 26.

Figure 8:
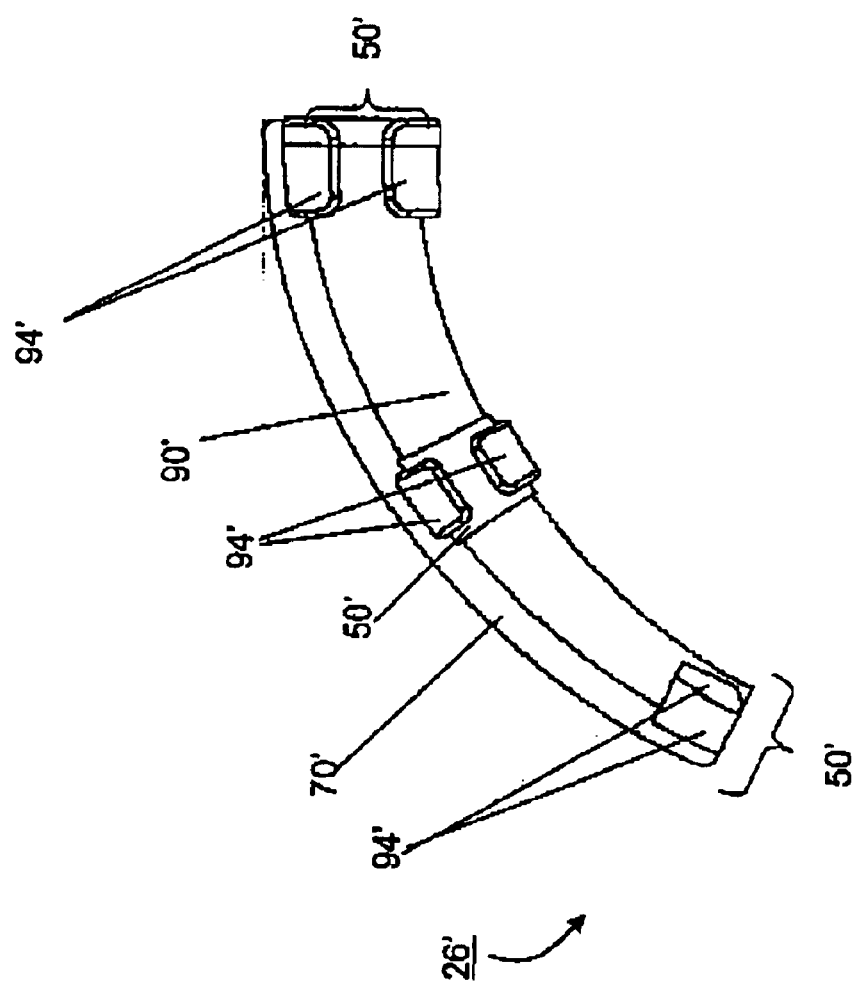
FIG. 8 is a side view of another embodiment of a fiber clip constructed in accordance with the principles of the invention.

While the invention has been shown and described with reference to specific preferred embodiments, it should be understood by those skilled in the art that various changes in form and detail may be made therein without departing from the spirit and scope of the invention as defined by the following claims. For example, FIG. 8 shows a side view of another embodiment of a fiber clip 26' having a clip body 70' with a single groove 90' extending therethrough. The clip body 70' also has a plurality of couplers 50' extending therefrom for coupling to fibers, each coupler 50' having a pair of arms 94' extending from opposite sides of the groove 90'. The dimensions of this single-fiber fiber clip 26' and the extent of vertical and lateral bending imposed by the fiber clip 26' on fibers coupled thereto are similar to that of the dual-fiber fiber clip 26 embodiment described above. This single-fiber fiber clip 26' illustrates that the principles of the invention apply also to fiber clips that vertically and laterally bend only a single fiber. Similarly, the principles of the invention extend also to embodiments for managing more than two fibers.

What is claimed is:

1. A cable clip for guiding a cable connected to a faceplate of a circuit pack comprising:

a clip body having a front side, au upper end, and a lower end, the front side of the clip body having a groove extending therethrough from the upper end to the lower end, the groove being sized to receive the cable and shaped to bend the cable within the rove downwards and towards one side of the faceplate when the cable is coupled to the clip body coupler means on the clip body for coupling the cable within the groove.

2. The cable clip of claim 1, wherein the cable is a fiber optic cable.

3. The cable clip of claim 1, wherein the groove is a first groove, and the clip body has a second groove extending therethrough from the upper end to the lower end adjacent to the first groove, the second groove being shaped for closely receiving and bending a second cable within the groove downwards and towards one side of the faceplate.

4. The cable clip of claim 1, wherein the coupler means includes a pair of spaced-apart arms, each am extending from one side of the groove, the ends of the arms terminating with a gap therebetween through which the cable is snapped into the groove to couple the cable to the clip body.

5. The cable clip of claim 1, wherein the coupler means is at the upper end of the clip body and couples to a boot of the cable.

6. The cable clip of claim 1, wherein the coupler means includes a plurality of couplers on the clip body holding the cable within the grove.

7. The cable clip of claim 1, wherein the clip body and coupler means are integrally constructed.

8. The cable clip of claim 1, wherein the cable is connected to one of a plurality of vertically arranged small form-factor pluggable fiber optic transceiver modules (SFPs), and the clip body bends the cable to a right side of SFPs.

9. An optical module, comprising:

a faceplate;

a small form-factor pluggable fiber optic transceiver modules (SFP) connected to the faceplate;

a fiber optic cable assembly connected to the SFP, the fiber optic cable assembly including a fiber optic cable;

a clip body having a front side, an upper end, and a lower end, the front side of the clip body having a groove extending therethrough from the upper end to the lower end, the groove being sized to receive the fiber optic cable and shaped to bend the fiber optic cable within groove downwards and towards one side of the faceplate when the cable is coupled to the clip body; and coupler means on the clip body coupling the fiber optic cable within the groove.

10. The optical module of claim 9, further comprising a second fiber optic cable assembly connected to the SFP, the second fiber optic cable assembly including a second fiber optic cable, and wherein the groove is a first groove, and the clip body has a second groove extending therethrough from the upper end to the lower end adjacent to the first groove, the second groove being sized to receive the second fiber optic cable and shaped to bend the second fiber optic cable within the second groove downwards and towards one side of the faceplate when the second cable is coupled to the clip body.

11. The optical module of claim 9, wherein the coupler means includes a pair of spaced-apart arms, each arm extending from one side of the groove, the ends of the arms terminating with a gap therebetween through which the fiber optic cable is snapped into the groove to couple the cable to the clip body.

12. The optical module of claim 9, wherein the coupler means is at the upper end of the clip body and couples to a boot of the fiber optic cable assembly.

13. The optical module of claim 9, wherein the coupler means includes a plurality of couplers on the clip body for holding the fiber optic cable within the groove.

14. The optical module of claim 9, wherein the clip body and coupler means are integrally constructed.

15. The optical module of claim 9, further comprising a plurality of SFPs, and wherein the clip body bends the fiber optic cable to a right side of the SFPs.

* * * * *

UNITED STATES PATENT AND TRADEMARK OFFICE
CERTIFICATE OF CORRECTION

PATENT NO. : 6,873,779 B1
DATED : March 29, 2005
INVENTOR(S) : Sonderegger et al.

It is certified that error appears in the above-identified patent and that said Letters Patent is hereby corrected as shown below:

<u>Column 6,</u>
Line 8, delete "au" and substitute -- an --;
Line 12, delete "rove" and substitute -- groove --;
Line 14, after "body" insert -- ; and --;
Line 27, delete "am" and substitute -- arm --;
Line 36, delete "grove" and substitute -- groove --;
Lines 42-43, after "of" and before "SFPs" insert -- the --;
Lines 55-56, after "within" and before "groove" insert -- the --.

Signed and Sealed this

Thirteenth Day of September, 2005

JON W. DUDAS
*Director of the United States Patent and Trademark Office*